United States Patent [19]
Rahm

[11] Patent Number: 5,857,425
[45] Date of Patent: Jan. 12, 1999

[54] FEED METERING APPARATUS

[76] Inventor: Thomas L. Rahm, R.R. 2, Box 91, Truman, Minn. 56088

[21] Appl. No.: 637,862

[22] Filed: Apr. 25, 1996

[51] Int. Cl.[6] .............................. A01K 61/02; G01D 5/00; A01G 27/00
[52] U.S. Cl. ..................... 119/52.1; 119/51.11; 116/281; 116/282; 222/41; 239/70
[58] Field of Search ................................ 119/51.02, 52.1, 119/57.92; 116/227, 281, 282; 222/41; 239/70, 71, 74

[56] References Cited

U.S. PATENT DOCUMENTS

| | | |
|---|---|---|
| 393,149 | 11/1888 | Gates . |
| 1,186,965 | 6/1916 | Baker . |
| 1,448,140 | 3/1923 | McSpadden . |
| 1,504,211 | 8/1924 | Butler . |
| 1,517,300 | 12/1924 | McCauley . |
| 1,700,659 | 1/1929 | Van Bergen . |
| 2,056,490 | 10/1936 | Skarass et al. ........................... 116/282 |
| 3,279,078 | 10/1966 | Skalka . |
| 3,443,437 | 5/1969 | Shalka . |
| 5,425,329 | 6/1995 | Pollock ................................... 116/227 |

*Primary Examiner*—John G. Weiss
*Assistant Examiner*—Dennis Ruhl
*Attorney, Agent, or Firm*—Nawrocki, Rooney & Sivertson, P.A.

[57] ABSTRACT

A feeder containing animal feed uses feed removal equipment to remove feed at a known constant rate. This feed metering apparatus is used to indicate the amount of feed remaining in the feeder at any time. This apparatus is operated to move a pointer indicating feed quantity only when feed is actually being removed from the feeder. The movement of the pointer is adjusted to correspond to feeder rates for different feeder equipment either by adjusting the duty cycle of a motor driving the pointer to different percentages of the feeder equipment operating time, or by adjusting the motor rpm rate, either by using an adjustable frequency changer to drive an ac motor, or by changing the power from ac to dc and using dc to drive a speed adjustable dc motor.

10 Claims, 9 Drawing Sheets

FEED METERING APPARATUS

FIELD OF THE INVENTION

This invention relates to the field of feed metering apparatus for animal feeders, and particularly to apparatus for determining the amount of feed in a feeder by operating only when feed is being conveyed from the feeder.

BACKGROUND OF THE INVENTION

The following apparatus provides a variety of means for determining the amount of feed in an animal feeder:

In Skalka, U.S. Pat. No. 3,279,078 a fill gauge has a pivoted indicator connected to a tension member disposed downward along the corrugated side of a feed bin. when the bin is filled the tension member is forced into the corrugations the full height of the bin which pivots the indicator to the full position. As feed is removed the tension member is forced into fewer corrugations which causes the indicator to pivot correspondingly toward the empty indication.

In Skalka, U.S. Pat. No. 3,443,437 a visual indication of the amount of grain within a bin consists of a plurality of pivotally supported paddle members spaced at various elevations within the pin which are pivoted in response to the grain level. The height of the pivoted members indicating the presence of grain indicates the height of the grain.

In Pollock, U.S. Pat. No. 5,425,329 fill indicator apparatus for a feed bin uses two visual indicators. The first visual indicator is an external flag which is mechanically connected to the feed level and moved linearly along the side of the bin in response to the feed withdrawal. A second and separate visual indicator uses a second external flag which responds to an increasing level of feed as the bin is being filled to prevent the bin from being overfilled.

All of these devices require a mechanical connection to at least one part located within the feeder proper. This results in the possibility of binding or other forces from the feed disposed against the part causing an inaccurate reading. It would be desirable to be able to indicate the amount of feed remaining in a feeder without the necessity of placing any parts within the feeder subject to forces which may cause inaccuracies in the read-out or jamming of the part resulting in total reading failure.

SUMMARY OF THE INVENTION

An animal feeder has feed removal equipment which removes feed from the feeder at a constant rate. This metering apparatus, which operates only when the feed removal equipment operates, indicates the amount of feed remaining in the feeder. When the feeder removal equipment is operated electrically, the metering apparatus is simply energized from the feeder apparatus circuit. If the feeder removal equipment is not operated electrically, some means must be provided to provide electrical power to the metering apparatus but only when the feeder removal equipment is actually in operation.

The metering apparatus is mounted within a vertically oriented cylinder located on the outside of the feeder. The cylinder has a vertical slot with adjacent fixed scales which corresponds to the quantity of feed remaining in the feeder. A carrier, slideably mounted within the slot, has its outer portion formed into a pointer.

As feed is withdrawn from the feeder, the carrier and integral pointer are driven downward along the slot at a rate corresponding to the known rate of feed withdrawal such that the pointer position always indicates the quantity of feed remaining in the feeder.

This is accomplished by a motor, energized when the feed removal equipment is in operation, which drives a reduction gear train which in turn drives a threaded rod within the cylinder. This rod is oriented parallel to the cylinder axis opposite the slot. A slide slideably enclosing the rod is connected through the slot to the carrier and integral pointer. A pin, slideably extending through a hole in the carrier perpendicular to the cylinder, extends inwardly through the slot and through a hole in the slide into the threads in the rod. The pin is urged inwardly by a coil spring. The inner end of the pin is pointed and normally engages the thread in the rod. This engagement of the pin with the rod thread causes the slide and carrier to move along the rod when the rod is rotated.

When the feeder is loaded the pin can be released from the threaded rod, by pulling outwardly on a knob attached to the outer end of the pin, thus freeing the carrier to permit changing the pointer location to correspond to the new amount of grain in the feeder.

In order to accommodate the different auger feed rates of different feeders, some means must be provided to change the rate of the pointer movement to correspond to the amount of feed being withdrawn from the feeder by a particular auger. This can be accomplished directly by changing the rod motor speed, or effectively by changing the rod motor duty cycle, i.e., by changing the percentage of time the rod motor operates versus the time that the feeder apparatus operates.

Both of these approaches are described in the three following embodiments. The first embodiment uses the effective approach where a motor drives a reduction gear train, which has the rod attached to its output, at a constant rpm. This motor is operated for a selected percentage of the time that the feeder apparatus operates. A second embodiment uses the direct approach where an adjustable frequency changer is used to change the rotation speed of an ac motor which drives the reduction gear train and rod. A third embodiment also uses the direct approach by changing the ac power from the auger circuit to dc, and using a dc motor to drive the reduction gear train and rod. A dc motor can drive the reduction gear train at different rotation rates because a dc motor can readily be adjusted to different rotation speeds.

The amount of feed remaining in the feeder is ascertained by simply observing the pointer position against the numbers. A linear transducer can also be attached to the carrier to indicate its position relative to the slot to provide a remote read-out of the pointer position. This read-out information can be sent to another location either by direct wiring or by some other means such as radio transmission. This eliminates the necessity of physically approaching the feeder to ascertain the quantity of its contents. The linear transducer and any equipment associated with the transducer must be energized by a separate circuit other than the feeder equipment circuit, since otherwise the data would be available only during auger operation.

Since the apparatus by its nature is usually used outdoors and is exposed to temperature extremes, an electrical heating element and thermostat energized by a separate circuit can be provided to heat the apparatus to avoid any reliability problems caused by low temperature operation.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein.

DETAILED DESCRIPTIONS OF THE INVENTION

Figure 1:
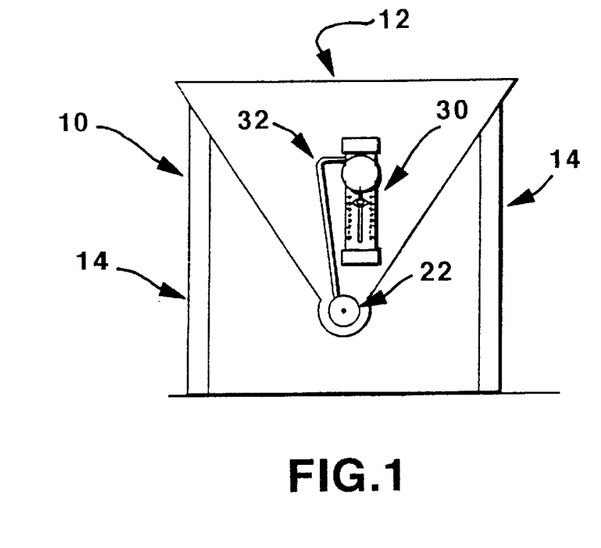
FIG. 1 is an end view of a feeder and attached metering apparatus.
Figure 1A:
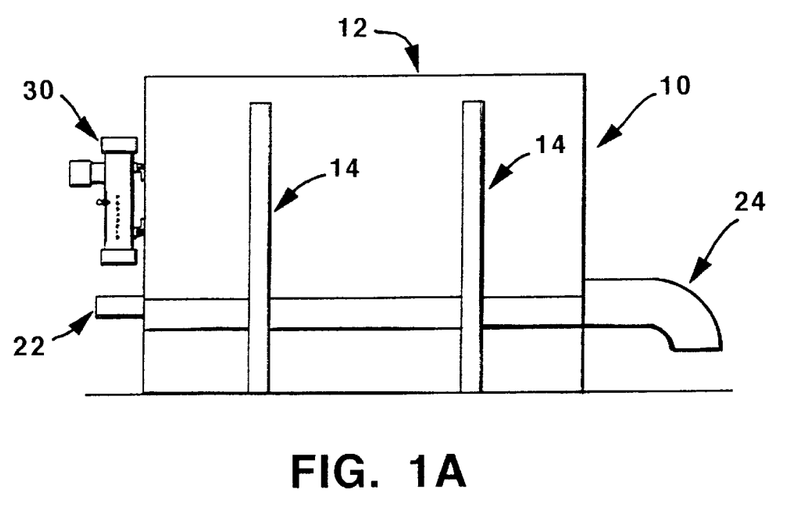
FIG. 1A is a side view of a feeder and attached metering apparatus.
Figure 1B:
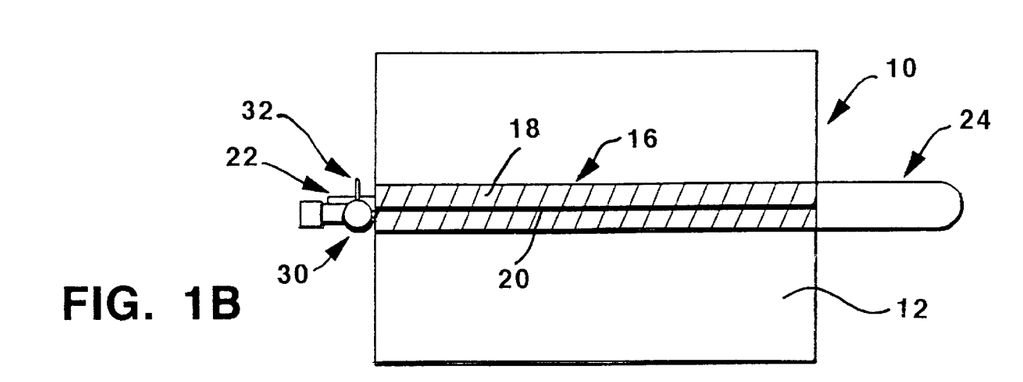
FIG. 1B is a top view of a feeder and attached metering apparatus.

Overviews of a feeder 10 with attached feed metering apparatus 30 are shown in FIGS. 1, 1A and 1B. Feeder 10, comprises an upwardly open, and generally V-shaped feed container 12, supported by four legs 14, two on each side. Feed container 12 opens downward into auger section 16, which contains an auger 18 with a central shaft 20, driven by a conventional 117 volt ac, 60 hertz electric auger motor 22. When shaft 20 is driven by auger motor 22, auger 18 will discharge feed from feeder 10 through discharge chute 24 at a constant rate. This specific arrangement of feeder 10 is not important in the operation of the present invention. This illustration of feeder 10 is intended merely to represent any type of feeder which uses a powered auger, or its equivalent, to discharge feed from the feeder at an essentially constant rate. Here where auger motor 22 is operated electrically the electrical power for the motor is used by the metering apparatus 30 to operate this equipment only when the feed removal apparatus 10 operates.

Feed metering apparatus 30 is mounted on one end of feeder 10 and connected electrically to the circuit powering motor 22 through conduit 32. Details showing the attachment of the various parts are not shown since the specific attachment for the mechanical parts of apparatus 30 is not critical.

Figure 2:
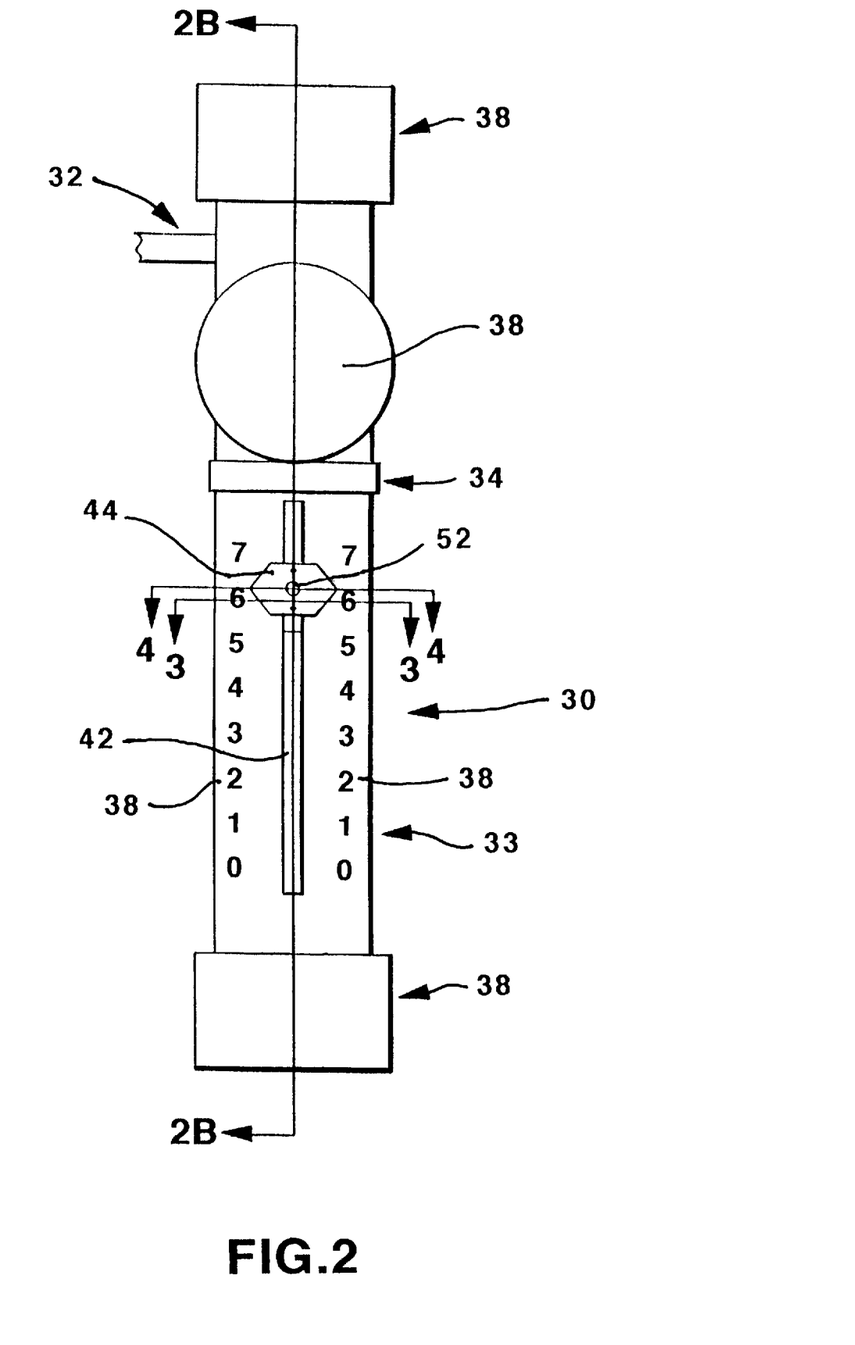
FIG. 2 is a front view of the metering apparatus.
Figure 2A:
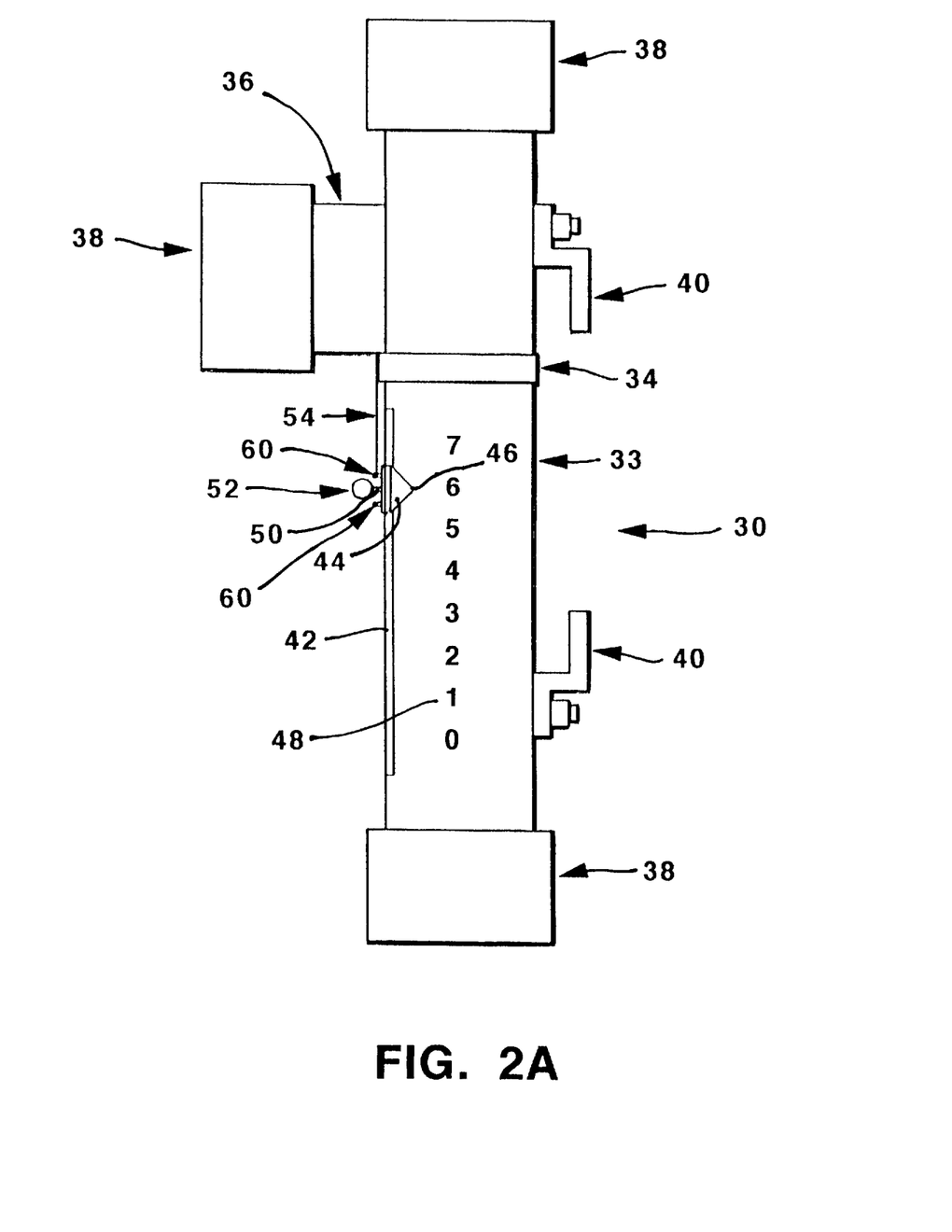
FIG. 2A is a side view of the metering apparatus.

External views of metering apparatus 30 are shown in FIGS. 2 and 2A. Apparatus 30 has a cylindrical shaped plastic body 33 with a right angle extension 36 of the same diameter. The preferred orientation of body 33 is the vertical orientation shown, since this provides an intuitive feeling to an observer of the amount of feed remaining in the feeder.

As oriented, body 33 is divided into two sections, an upper and lower, which are joined together by a coupler 34, attached to the two sections by screws which provides ready access to the interior for installation or maintenance of the various internally located parts. Plastic end caps 38 fit over the ends of body 34 and extension 36 and provide an essentially waterproof seal. Caps 38 are also attached by screws through the caps into body 34 and extension 36 for ready access. Brackets 40 are attached to body 34 by bolts. Apparatus 30 can be attached to feeder 10 or any other surface using brackets 40.

Slot 42 in body 33 slideably mounts carrier 44. The outer portion of carrier 44 is formed into two pointers 46 directed outwardly from slot 42. Two identical sets of numbers 48 along slot 42 provide information of the remaining amount of feed in tons. A pin 50 which slideably extends through a hole in carrier 44 has a knob 52 on its outer end used to pull the bolt in an outwardly direction. Pin 48 is spring loaded into body 33 which will be described further later.

Line 54 extending outward through a hole, not shown in these views, in extension 36 attaches to the nearest of two bolts 60 which extend through holes in carrier 44. A linear transducer 55, not shown in these figures, provides a remote read-out capability using the information provided by line 54. This will be described further later.

Figure 3:
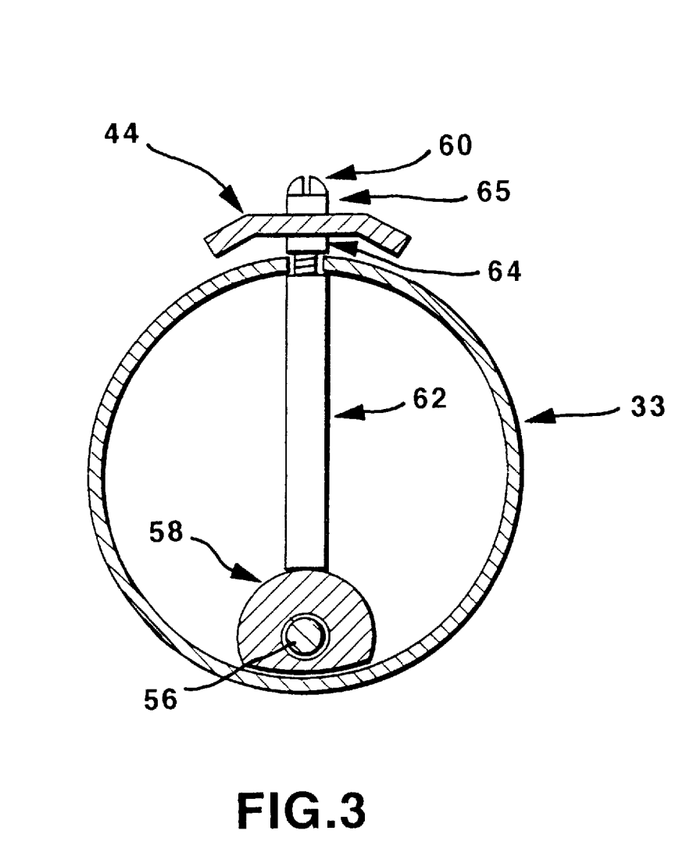
FIG. 3 is a cross-section view taken along 3—3 of FIG. 2.
Figure 4:
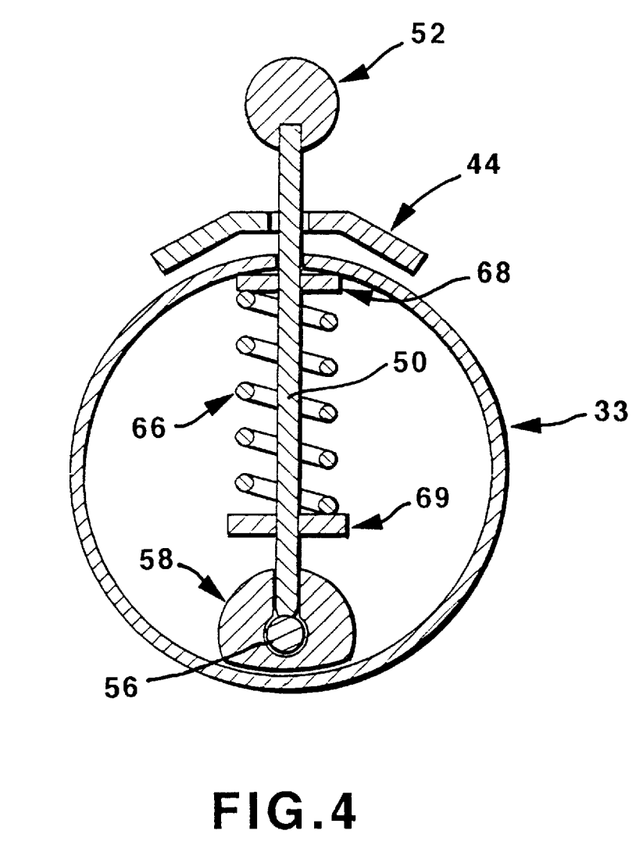
FIG. 4 is a cross-section view taken along 4—4 of FIG. 2.

FIGS. 3 and 4 provide further details of the slidable arrangement of carrier 44 on slot 42 of body 33, and the coupling of the carrier to threaded rod 56. Rod 56 extends from the upper to the lower portions of body 33 and is driven by a motor which will be described later.

A generally cylindrical shaped slide 58 having the same length as carrier 44 is positioned directly opposite the carrier within body 33. Slide 58 has a generally centered hole along its axis which slideably contains rod 56. The portion of slide 58 facing the interior of body 33 is shaped to conform to the body. A pair of bolts 60 extending through holes in opposite ends of carrier 44 and through slot 42, are screwed into mating threaded holes in slide 58. A pair of plastic sleeves 62 enclose bolts 60 offsets threaded rod 60 within body 33 opposite slot 42 and also orients rod 56 essentially parallel with the axis of body 33. The attachment of slide 58 to carrier 44 by bolts 60 couples these two parts together. A pair of plastic washers 64 also enclose bolts 60 between carrier 44 and body 33. Plastic washers 64 and plastic sleeves 62 minimize the friction when carrier 44 and slide 56 move along slot 42 of body 33.

Pin 50 slideably extends through a hole in carrier 58, through slot 42, and through a hole in slide 58 into threaded rod 56. The inner end of pin 50 is pointed such as to engage the thread of rod 56. The outer end of pin 50 has knob 52 attached. Pin 50 extends through washer 68 and washer 69. Washer 68 is free to slide along pin 50 while washer 69 is attached to the pin. Coil spring 66 is positioned around pin 50 between washers 68 and 69. With this arrangement spring 66 will urge pin 50 inward towards rod 56.

Pulling pin 50 upward, using knob 52, releases the pin from rod 56 and permits repositioning carrier 44 and attached slide 58 along the rod whenever container 12 is refilled.

Figure 5:
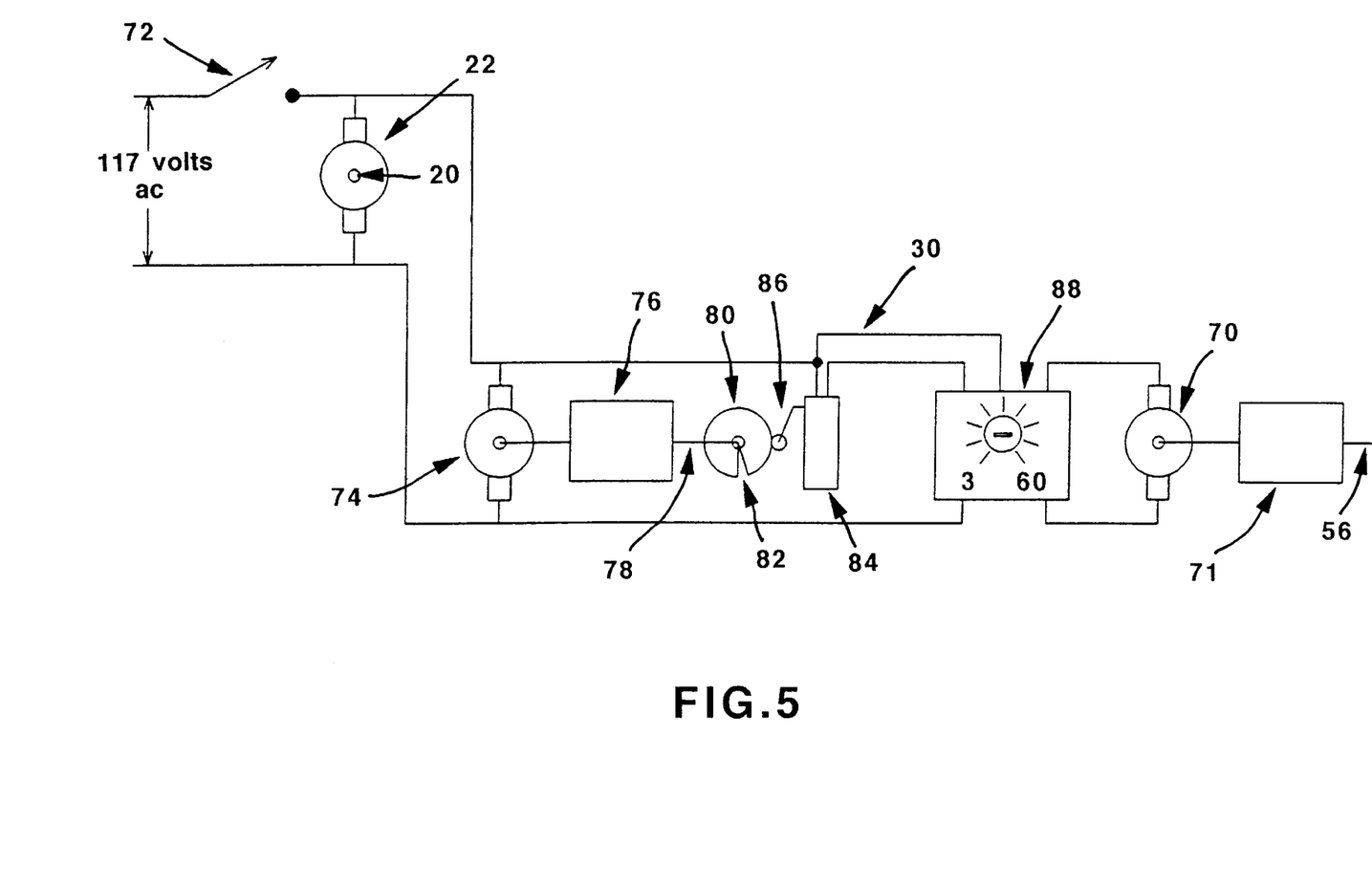
FIG. 5 is a circuit diagram of the first embodiment.

The electrical circuitry and gearing for the motor which rotates threaded rod 56 for the first embodiment is shown in FIG. 5. Switch 72 switches the circuit providing power for auger motor 22. Apparatus 30 is powered by this same circuit and is switched on or off by switch 72 along with motor 22. Cam motor 74, which is an essentially constant speed 60 hertz 117 volt ac motor of 720 rpm drives reduction gear train 76. Reduction gear train 76 gears the rpm down and drives its output shaft 78 at one rpm. Cam 80, attached to output shaft 78, has a single indentation 82 around its periphery. Switch 84 has a cam follower 86 terminating in a roller which will open the switch each time that the cam follower is opposite indentation 82 in cam 80.

Opening switch 84 will cause timer 88 to provide line voltage at its output to rod motor 70 for a preselected period of time. Timer 88 can be a National Controls Corporation Model No. 03T-00060-321 with a 360 second timing range, which is adjusted by screwdriver, or an equivalent. Screwdriver adjustment 90 for timer 88 permits changing this preselected time interval between 3 and 60 seconds. This arrangement effectively changes each 60 seconds of operation of the circuit providing power to auger motor 22 to the interval of time provided by timer 90. Motor 70 drives reduction gear train 71 which drives rod 56 at 10 rpm.

The following Table 1 is representative of the conversion of the amount of feed delivered by auger motor 22 in pounds per minute for different feeder sizes in tons to indicate the correct time in seconds for timer 90 for accurate tracking. This is merely representative since a similar table can be determined for any size tank and any delivery rate. A table of this type permits adjusting the time interval such that rod 56 will rotate to drive pointers 46 the correct amount versus numbers 48 for the amount of feed actually being delivered by auger 18.

TABLE 1

| AUGER RATE | TANK SIZE—Tons | | | |
|---|---|---|---|---|
| #/Min. | 5 | 6 | 8 | 10 |
| 50 | 57.5 | 47.9 | 35.9 | 28.8 |
| 54 | | 51.8 | 38.8 | 31.1 |
| 58 | | 55.6 | 41.7 | 33.4 |
| 66 | | | 47.4 | 38.0 |
| 70 | | | 50.3 | 40.3 |

Intersection Yields Timer Setting in Seconds

Figure 6:
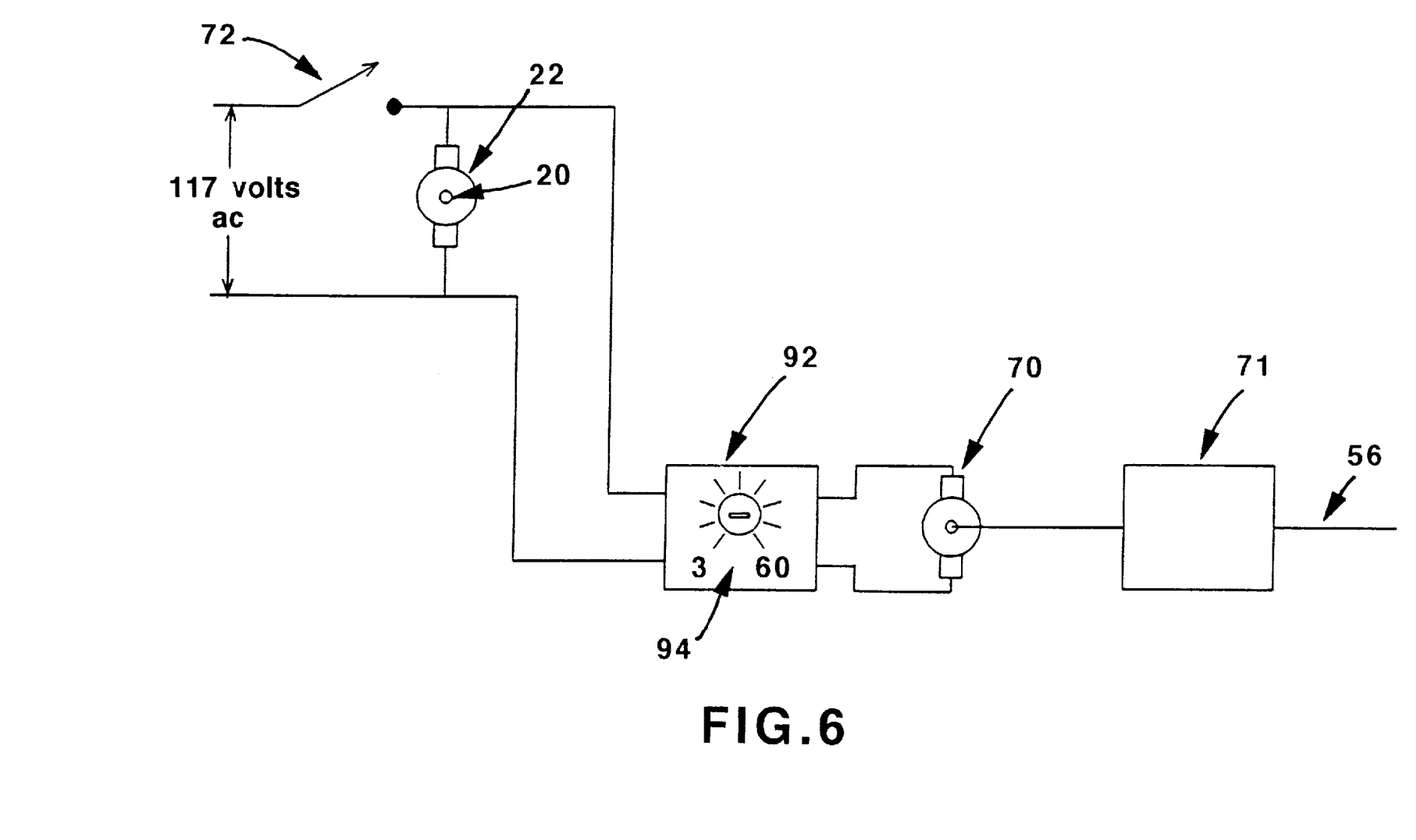
FIG. 6 is a circuit diagram of the second embodiment.

In FIG. 6, a second embodiment of the present invention, auger motor 22 is shown being driven by the same circuit and controlled by the same switch 72 as the first embodiment. Apparatus 30 has the same rod motor 70 driving the same reduction gear train 71, which drives rod 56. Here however only frequency changer 92 is interposed between the circuit of the feeder apparatus and motor 70. Frequency changer 92, which can be any one of a number of commercially available frequency changers available, changes the line frequency powering motor 22 from 60 hertz to frequencies ranging from 3 to 60 hertz. Frequency adjustment 94 has a screwdriver adjustment which permits selecting a frequency within this range. Powering motor 70 from frequency changer 92 permits changing the rotation speed of rod 56 between 0.5 and 10 rpm.

Figure 7:
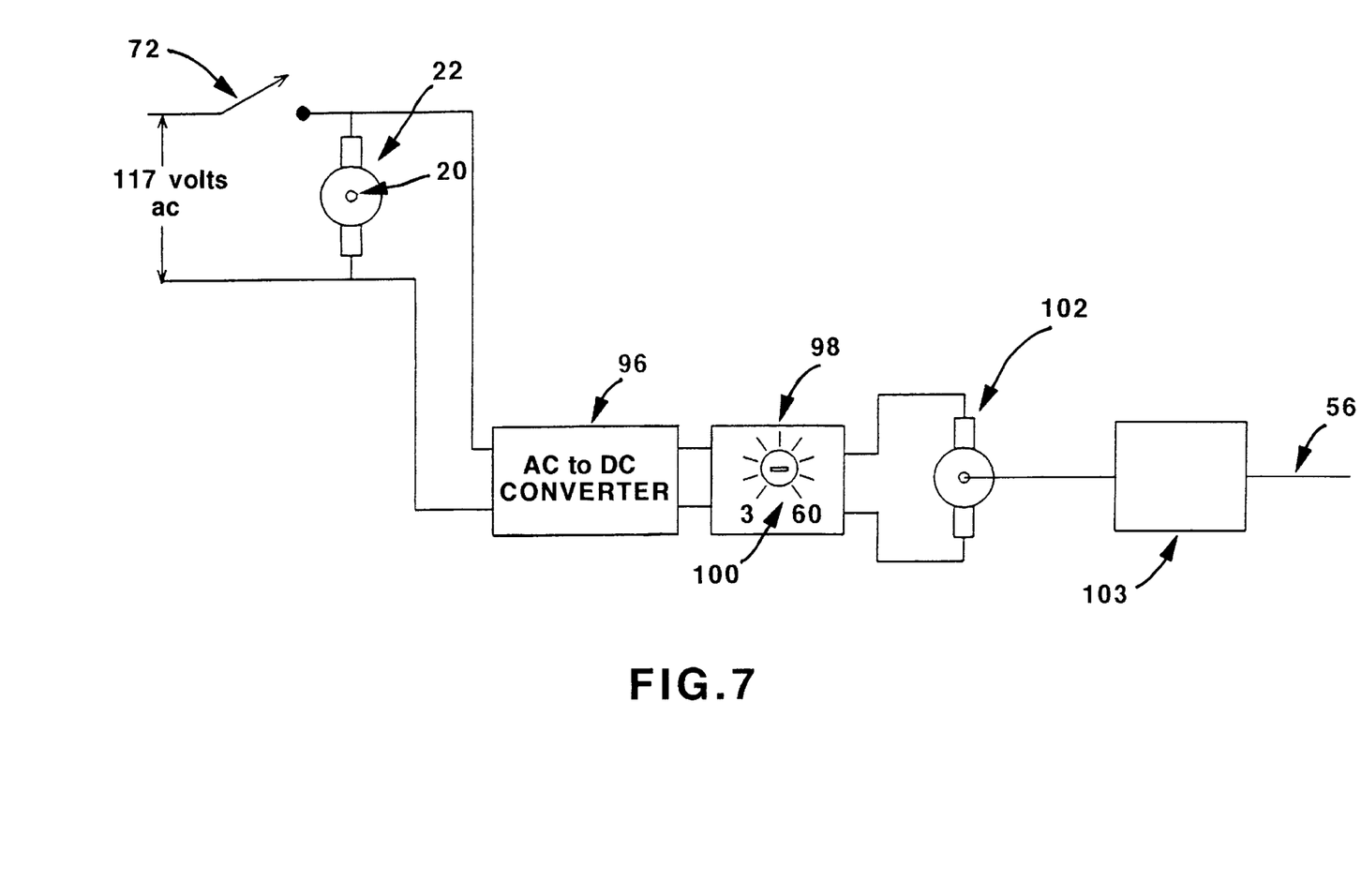
FIG. 7 is a circuit diagram of the third embodiment.

FIG. 7 shows a third embodiment of the present invention. Here auger motor 22 is shown being driven by the same circuit and controlled by the same switch 72 as the first and second embodiments. Here however the circuit providing power for motor 22 also powers ac to dc converter 96. Converter 96 can be a conventional full-wave bridge rectifier or any equivalent arrangement, which converts ac to dc voltage. This dc voltage is provided to controller 98, which has a screwdriver adjustment 100, and provides the power for direct current motor 102. Direct current motor 102 now drives rod 56 through reduction gear train 103. Controller 98 changes the rate of rotation of motor 102 such that the rotation of rod 56 changes over the same range as when driven by motor 70 in the first and second embodiments. The connection and arrangement of controller 98 here is merely illustrative. Any number of available controllers for appropriate dc motors can be used, the only requirement here being that the proper rotation range for rod 56 can be obtained.

Tables similar to table 1 can be determined for the second and third embodiment for different feeder sizes and different feed removal rates in pounds per minute to establish the motor rpm for correct pointer movement. In all embodiments the amount of feed actually removed per minute from the feeder can be determined by operating the feed removal equipment for a known period of time and then weighing the amount of feed removed.

Figure 8:
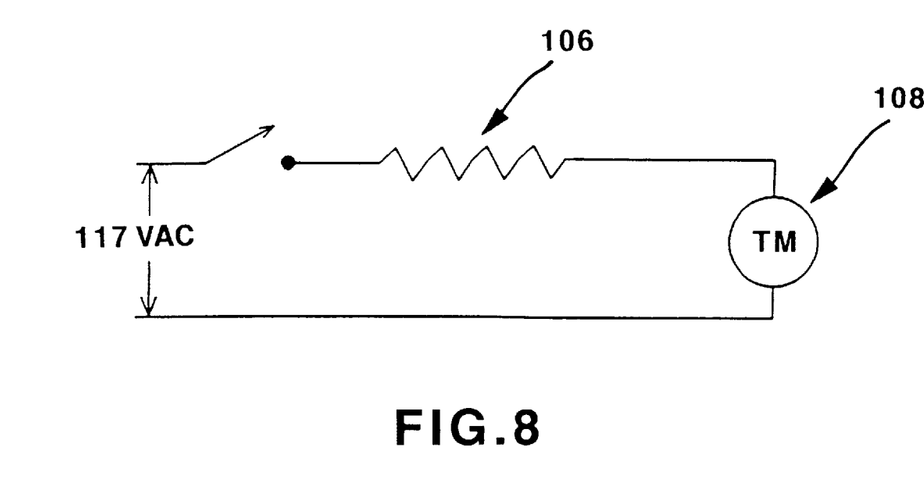
FIG. 8 is a circuit diagram of an electrical heater and thermostat.

In FIG. 8 a separate circuit and switch 104 provides power to resistance heater 106 and thermostat 106. Resistance heater 106 and thermostat 106 are located within body 33 adjacent to the motors of apparatus 30. Heater 106 is selected to have adequate power to warm the motors to a range, controlled by thermostat 108, adequate to ensure reliable operation.

Figure 2B:
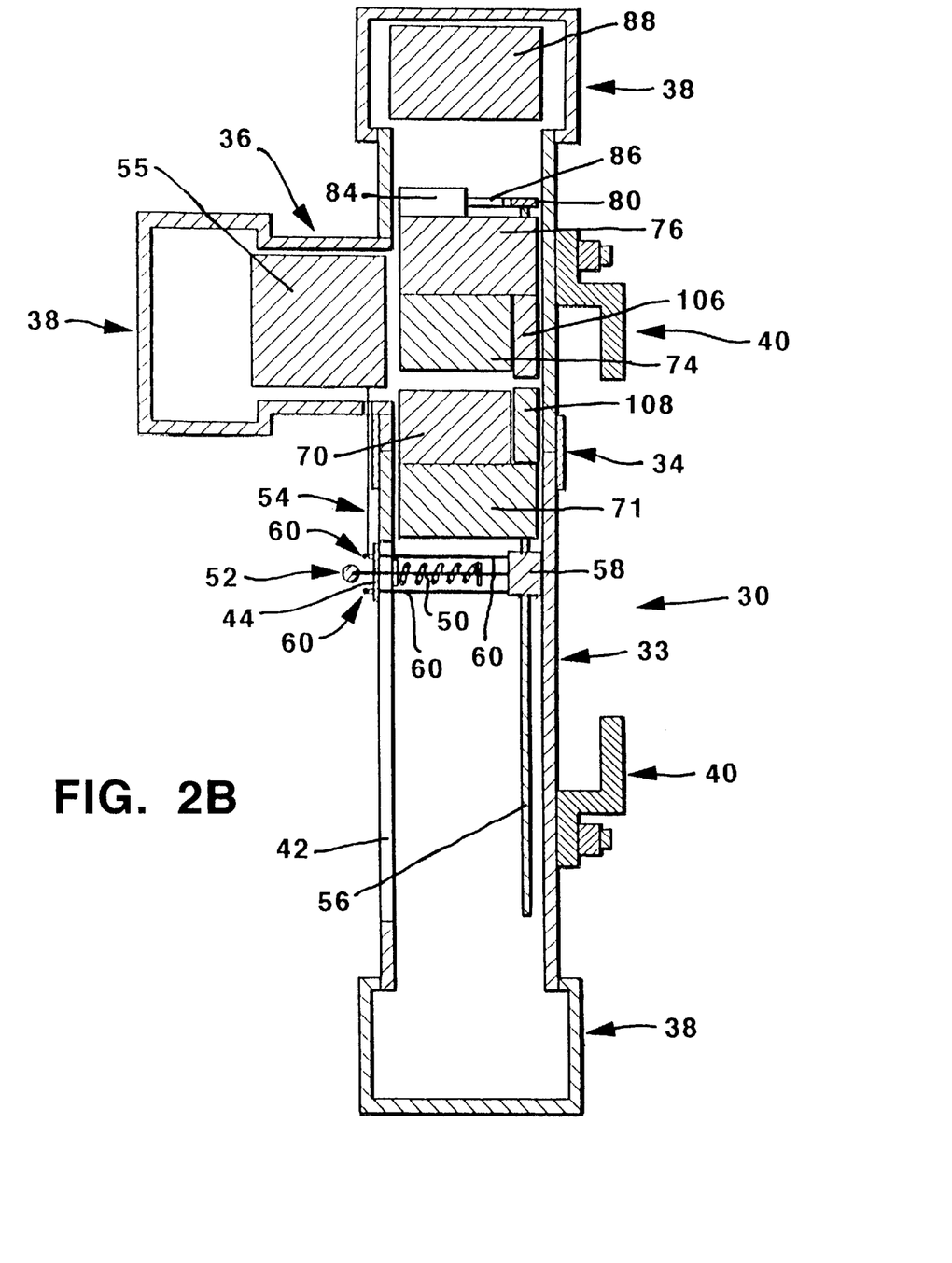
FIG. 2B is a cross-section view taken along 2B—2B of FIG. 2.

FIG. 2B shows the physical arrangement of apparatus 30 and body 33 for the first embodiment of the apparatus. Body 33 consists of two separate cylindrical shaped parts which are held together by coupler 34. Right angle extension 36 from body 33 and the body are all closed by end caps 38.

Motor 74 is mounted adjacent to and drives reduction gear train 76 which rotates cam 80. Cam follower 86 bears against cam 80 to turn switch 84 on or off depending on the rotation position of cam 80. Timer 90 which is controlled by switch 84 to provide power to motor 70 is mounted within the uppermost end cap 38. Motor 70 is mounted adjacent to and drives reduction gear train 71. Rod 56 is attached to the output of reduction gear train 71. Slide 58, attached to carrier 44 by bolts 60 and pin 50, which engages threads in rod 56, moves along the length of rod 56 as it rotates. The lowest end of rod 56 is free of any support which permits slide 58 to simply move off the end of the rod if the rod is rotated too far.

Figure 9:
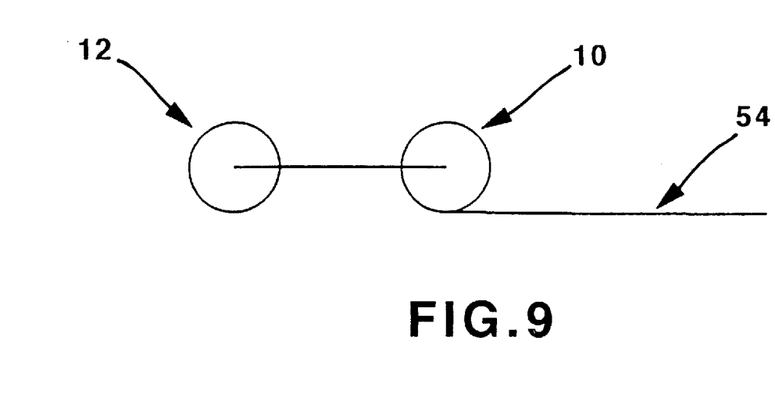
FIG. 9 is a circuit diagram of a linear transducer.

Linear transducer 55 is mounted within right angle extension 36 and is attached to adjacent bolt 60 by line 54 which extends outward from the transducer through an access hole in the extension. As carrier 44 moves downward from transducer 55 line 54 provides information of the position of carrier 44 to the transducer for remote transmission. This transducer can be a UniMeasure of the LX Series transducer or an equivalent.

Electric heater 106 and thermostat 108 are mounted within body 33 adjacent to the temperature sensitive elements, namely, motors 70 and 74 and reduction gear trains 71 and 76. The heater is most effective in this adjacent position. A number of commercially available heaters and thermostats are available which are suitable for this purpose and an appropriate combination can be selected readily by one skilled in the art.

The power delivered by any of the motors in this apparatus is relatively modest since the motors are all used to drive a reduction gear, which in turn, drive only a pointer mechanism. Any number of instrument type alternating or direct current motors, depending upon the particular embodiment, can readily be selected for this application by one skilled in the art.

The second and third embodiments are physically arranged similar to the first embodiment in that the motor and reduction gear train for rod 56 is always positioned the same as motor 70 and reduction gear train 71 of the first embodiment. The different components for the second or third embodiment are essentially substituted for the first embodiment components.

The physical placement of the parts making up apparatus 30 is not particularly critical. Slot 42 and carrier 44 should be generally centered on body 33 for maximum visibility. Motor 70 driving reduction gear train 71 and rod 56 must be positioned such that the rod is parallel and opposite to slot 42 to permit the rod to drive the carrier. If a transducer 55 is used it must be located adjacent to slot 42 near the driven end of carrier 44 so line 54 can engage the carrier. If a heater 106 and thermostat 108 are provided they must be mounted near the motors and reduction gear trains for effectiveness. Other than these requirements the physical location of the parts is not critical.

While these embodiments all show an attachment to a circuit which powers motor 22, this is not an absolute requirement but merely a matter of convenience where an electrical powered auger 18 is used. The only critical requirement with respect to auger 18, or any power driven feed removal equipment, is that apparatus 30 operates when, but only when, feed is being removed from feeder 10. If auger 18 were driven at a known constant rate by an engine rather than a motor, and if apparatus 30 were still operated only when the auger is actually being operated, the apparatus would still function correctly. This would require the use of some means to switch the electrical circuit providing power to apparatus 30 whenever the auger operates, but this can be accomplished by such arrangements as, for example, simply automatically closing a switch to a circuit providing electrical power to apparatus 30, whenever auger 30 is engaged. A number of other equivalent arrangements, obvious to those skilled in the art, could accomplish the same results.

Similarly while a specific arrangement of carrier 44 with integral pointers 46 slideably mounted within slot 42 such as to move relative to numbers 48 adjacent to the slot is shown here, any other arrangement which will indicate the amount of feed remaining within a feeder which will change correspondingly as feed is removed provides all of the critical functions of this apparatus.

This information as to the amount of feed remaining in the feeder could even be indicated by changing numbers presented adjacent to a fixed pointer since the same information would be conveyed. This could readily be accomplished by driving a belt containing a number scale past a fixed pointer using the same motor and reduction gear train that drives the rod in the above embodiments. Again, one skilled in the art can readily provide a number of such arrangements.

While this invention has been described with respect to the three specific embodiments described above, these descriptions are not intended to be construed in a limiting sense. Various modifications of the illustrative embodiments, as well as other embodiments of the invention, will be apparent to persons skilled in the art upon reference to these descriptions. It is therefore contemplated that the appended claims will cover any such modifications or embodiments as fall within the true scope of the invention.

I claim:

1. Apparatus for indicating the amount of feed in an animal feeder, the feeder having a feed container and feed removal means for removing feed from the feed container at a uniform rate, said apparatus comprising:
    a) feed quantity indicator means for indicating the amount of feed in said feeder;
    b) means external to the feed container for changing the amount of feed indicated by said feed quantity indicator means, whenever feed is being removed from the feeder by said feed removal means, such that the quantity of feed indicated corresponds to the amount of feed remaining within said feeder.

2. Apparatus as in claim 1 wherein said feed quantity indicator means comprises a movable pointer, a fixed scale and means external to the feed container for moving said movable pointer along said fixed scale.

3. Apparatus as in claim 2 wherein said means for changing the amount of feed indicated by said feed quantity indicator means comprises:
    a) interval determining means for dividing the time the feeder removal means operates into a sequence of equal predetermined time intervals; and
    b) timing means, operated once each predetermined time interval, for providing a predetermined output signal interval, which is no longer than said predetermined time intervals, for each timing means operation;
    c) means for moving said movable pointer along said fixed scale at a predetermined rate during each timing means output signal interval.

4. Apparatus as in claim 3 wherein:
    a) said interval determining means comprises:
        i) a motor having an essentially constant rotation rate;
        ii) a reduction gear train having an input shaft and an output shaft, said input shaft being driven by said motor;
        iii) cam means driven by said reduction gear output shaft for providing a single cam change for each output shaft revolution;
        iv) cam follower means having a switch with output contacts for providing a switch output closure for every change in said cam means such as to divide the total operating time into equal predetermined time segments interspersed by switch closures;
    b) said timing means further comprises:
        i) input terminals which, when closed, initiate a timing interval, said input terminals being connected to said cam follower switch;
        ii) output terminals whose closure provides the timer interval output signal;
        iii) adjusting means for selecting a predetermined timer interval.

5. Apparatus as in claim 4 wherein said means for moving said movable pointer along said fixed scale comprises:
    a) a motor having an essentially constant rotation rate having power provided by said timing means output switch closure;
    b) a reduction gear train having an input shaft and an output shaft, said input shaft being driven by said motor;
    c) a threaded rod attached coaxially to said reduction gear train's output shaft;
    d) pointer follower means for following the threads in said threaded rod arranged such that, whenever said motor is operated, said pointer will be driven along said fixed scale at a rate corresponding to the rate of rotation of said motor.

6. Apparatus as in claim 5 wherein said pointer follower means comprises:
    a) a slot extending along said scale;
    b) a carriage, having a portion thereof formed into said pointer;
    c) said rod being positioned within and parallel to said slot at a predetermined distance;
    d) a generally cylindrically shaped slide having a generally centered axis which slideably encloses said rod along the axis and opposite said carriage, said slide having connection means for connecting said slide to said carriage through said slot;
    e) said carriage having a generally centered hole opposite and perpendicular to said slot and said slide having a hole opposite to and facing said carriage hole extending inward to said rod;

g) a pin which slideably extends through said hole in said carriage and through said hole in said slide to said rod, said pin having a point on the end adjacent to said rod sized to engage the threads in said rod, and a knob attached to the opposite end;

d) spring loading means for urging said pin inwardly such that the point of said pin will normally be urged within the thread in said threaded rod and the pin will move the carriage and pointer along the scale as the rod rotates, and such that the pin can be withdrawn from the thread in said rod by pulling on said knob against said spring loading means to reposition said pointer.

7. Apparatus as in claim 2 wherein said means for changing the amount of feed indicated by said feed quantity indicator means comprises:

a) converter means for changing alternating current to direct current;

a) a direct current motor having means for selecting a rate of rotation;

b) a reduction gear train having an input shaft and an output shaft, said input shaft being driven by said motor;

c) a threaded rod coaxially attached to said reduction gear train output shaft;

d) pointer follower means for following the threads in said threaded rod such that said pointer will be driven along said fixed scale at a rate corresponding to the rate of rotation of said motor.

8. Apparatus as in claim 2 wherein said means for changing the amount of feed indicated by said feed quantity indicator means comprises:

a) frequency changer means for changing the frequency of alternating current having means for selecting a particular frequency;

b) an alternating current motor which rotates at a rate proportional to the frequency of the alternating current source;

c) a reduction gear train having an input shaft and an output shaft, said input shaft being driven by said motor;

c) a threaded rod coaxially attached to said reduction gear train output shaft;

d) pointer follower means for following the threads in said threaded rod such that said pointer will be driven along said fixed scale at a rate corresponding to the rate of rotation of said motor.

9. Apparatus as in claim 2 having electrical heating means for warming said apparatus, said heating means having thermostat means for controlling the temperature of said apparatus to a predetermined range.

10. Apparatus as in claim 2 having transducer means attached to said pointer means for providing information of the position of said pointer to a remote location.

* * * * *